US012356301B2

(12) United States Patent
Favero et al.

(10) Patent No.: US 12,356,301 B2
(45) Date of Patent: Jul. 8, 2025

(54) TAP ON MOBILE DEVICE ZONES

(71) Applicant: Stripe, Inc., South San Francisco, CA (US)

(72) Inventors: Ross Taylor Favero, Seattle, WA (US); Margaret Anne White, San Francisco, CA (US); Kelly Moriarty, Seattle, WA (US)

(73) Assignee: STRIPE, INC., South San Francisco, CA (US)

( * ) Notice: Subject to any disclaimer, the term of this patent is extended or adjusted under 35 U.S.C. 154(b) by 7 days.

(21) Appl. No.: 17/975,421

(22) Filed: Oct. 27, 2022

(65) Prior Publication Data
US 2024/0147204 A1    May 2, 2024

(51) Int. Cl.
*H04W 4/80*     (2018.01)
*G06F 3/0481*   (2022.01)
*G06F 3/14*     (2006.01)
*G06Q 20/32*    (2012.01)
*H04W 4/029*    (2018.01)

(52) U.S. Cl.
CPC ............ *H04W 4/80* (2018.02); *G06F 3/0481* (2013.01); *G06F 3/14* (2013.01); *G06Q 20/3278* (2013.01); *H04W 4/029* (2018.02)

(58) Field of Classification Search
CPC ........ G06F 3/0481; G06F 3/14; G06F 3/0487; G06F 3/04895; H04W 4/80; H04W 4/029; H04M 2250/04; H04B 5/0025; G06Q 20/3278; G07G 1/009
See application file for complete search history.

(56) References Cited

U.S. PATENT DOCUMENTS

| | | | | |
|---|---|---|---|---|
| 8,355,003 | B2* | 1/2013 | Pope | A61B 1/00133 |
| | | | | 345/170 |
| 9,215,004 | B2* | 12/2015 | Ogura | H04B 7/26 |
| 10,129,432 | B2* | 11/2018 | Beatty | H04N 1/4413 |
| 10,404,089 | B2* | 9/2019 | Kasar | H02J 50/10 |
| 10,467,445 | B1* | 11/2019 | Rule | G06Q 20/352 |
| 11,640,582 | B2* | 5/2023 | Singal | G06Q 50/00 |
| | | | | 382/187 |
| 2008/0093447 | A1* | 4/2008 | Johnson | G06V 30/142 |
| | | | | 235/383 |
| 2008/0194298 | A1* | 8/2008 | Panabaker | H04W 4/80 |
| | | | | 455/566 |

(Continued)

OTHER PUBLICATIONS

Cody Toombs, "Android Pay v1.5 prepares to show new users where to find NFC on their phones and might be experimenting with secure element again [APK Teardown]", www.androidpolice.com evidenced by Archive.org, Aug. 12, 2016, pp. 1-4 (Year: 2016).*

(Continued)

*Primary Examiner* — Andrew L Tank
(74) *Attorney, Agent, or Firm* — Womble Bond Dickinson (US) LLP

(57) ABSTRACT

The present disclosure describes identifying a type of mobile device, determining a location of a near-field communication (NFC) device (e.g., NFC reader) within a mobile device (e.g., a mobile phone) based on its type, creating a user interface displayed on the mobile device with a visual indication of a tap zone for the NFC device based on its location within the mobile device, and then displaying the user interface on a display screen.

20 Claims, 8 Drawing Sheets

(56) References Cited

U.S. PATENT DOCUMENTS

| | | | | |
|---|---|---|---|---|
| 2009/0193500 | A1* | 7/2009 | Griffin | G07F 17/32 726/2 |
| 2012/0208458 | A1* | 8/2012 | Iwasaki | H04B 5/00 455/41.1 |
| 2013/0026981 | A1* | 1/2013 | Van Der Lee | H02J 50/10 320/108 |
| 2013/0303084 | A1* | 11/2013 | Narendra | G06F 3/0488 455/41.1 |
| 2014/0080411 | A1* | 3/2014 | Konanur | H04B 5/0081 455/41.1 |
| 2014/0168012 | A1* | 6/2014 | Mankowski | H01Q 3/04 342/359 |
| 2014/0191988 | A1* | 7/2014 | Corrion | H04B 5/0012 345/173 |
| 2014/0335790 | A1* | 11/2014 | Dees | H04W 76/14 455/41.2 |
| 2015/0120817 | A1* | 4/2015 | Jeong | G06F 3/1454 709/203 |
| 2015/0312879 | A1* | 10/2015 | Lagnado | G06K 7/10386 455/41.1 |
| 2016/0360348 | A1* | 12/2016 | Ueda | G09G 5/02 |
| 2017/0168759 | A1* | 6/2017 | Hirotani | H04N 1/00307 |
| 2017/0181087 | A1* | 6/2017 | Kato | H04W 4/80 |
| 2017/0337403 | A1* | 11/2017 | Ohno | H04B 5/70 |
| 2018/0175676 | A1* | 6/2018 | Ikefuji | H04W 52/027 |
| 2018/0278739 | A1* | 9/2018 | Mei | H04M 1/72412 |
| 2020/0275249 | A1* | 8/2020 | Kim | H04W 12/0431 |
| 2020/0379622 | A1* | 12/2020 | Pignorel | G06F 3/04162 |
| 2021/0042132 | A1* | 2/2021 | Park | H04L 67/10 |
| 2021/0216988 | A1* | 7/2021 | Binder | G07F 9/009 |
| 2024/0370218 | A1* | 11/2024 | Chen | G06F 9/451 |

OTHER PUBLICATIONS

Authors et al., "Interactive NFC Grid Display Screens", IP.com Prior Art Database Technical Disclosure, Jan. 13, 2015, pp. 1-6, IP.com No. IPCOM000240206D (Year: 2015).*

A. Roehrs, C. A. da Costa and J. L. V. Barbosa, "A Proposal of a Mobile Payment System Based on Android," 2012 Sixth International Conference on Innovative Mobile and Internet Services in Ubiquitous Computing, Palermo, Italy, 2012, pp. 617-622, doi: 10.1109/IMIS.2012.86. (Year: 2012).*

Spinsante et al., "NFC-Based User Interface for Smart Environments", Feb. 24, 2015, Hindawi Publishing Corporation, Advances in Human-Computer Interaction, vol. 15, pp. 1-12 (Year: 2015).*

* cited by examiner

TAP ON MOBILE DEVICE ZONES

BACKGROUND

Some payment processing transactions are performed using point-of-sale (POS) terminals that have card readers that allow users to accept in-person payments. Some merchants instead employ mobile devices and/or tablets as their POS devices. More specifically, these merchants allow customers to pay and sign on a merchant's mobile phone or tablet to enable merchants to process payments made with credit cards, gift cards, and cash. To facilitate this operation, these mobile devices may use a combination of software, including application programming interfaces (APIs) and software development kits (SDKs) and a hardware reader that reads credit, debit or other payment cards and performs transactions.

More recently, contactless card payments are being used more prevalently to accept in-person payments. The contactless payments are usually enabled by the use of near-field communication (NFC), which is a wireless standard. To perform contactless card payments, the POS terminals have NFC reader devices that can receive information from an NFC device in a payment card when the payment card is placed within a certain distance of the NFC reader. Many such POS terminals include a sign indicating where a user should place, or tap, their payment card so that the payment card can be read by the NFC reader of the POS terminal. The area where a user should tap is often referred to as a tap zone.

However, when attempting to use a mobile device or tablet to collect contactless card payments, the process can be made more difficult because the tap zone may be in different places depending on the mobile device being used. In other words, different mobile devices have their NFC device located at different locations within the mobile device. This is particularly true with mobile phones that use the Android operating system. If a user does not know where to place their payment card, and their payment card cannot be read by the NFC reader of the mobile phone, then any attempted transaction may fail.

SUMMARY

The present disclosure is directed to determining a location of a near-field communication (NFC) device (e.g., NFC reader) within a mobile device (e.g., a mobile phone) and its associated tap zone, substantially as shown in and/or described in connection with at least one of the figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
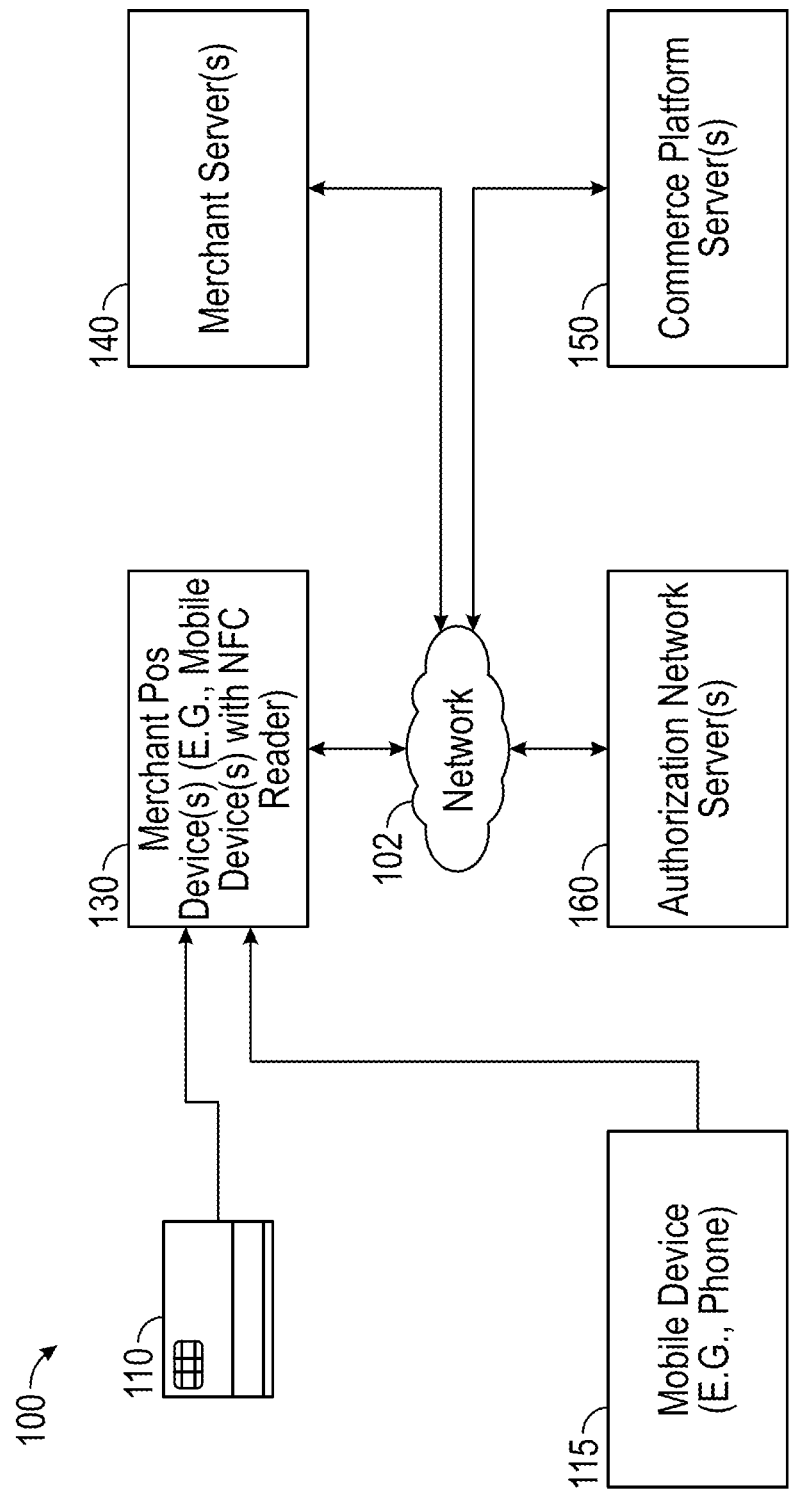
FIG. 1 is a block diagram of an exemplary system architecture that supports contactless payments using a mobile device that displays a tap zone on its display after determining the location of its Near Field Communication (NFC) device in its interior.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Techniques are disclosed herein to enable determining where a near-field communication (NFC) device is located within a mobile device. In some embodiments, a mobile device determines the location of its own NFC device within the mobile device. In some other embodiments, a mobile device determines the location of an NFC device within another mobile device. The mobile devices can be a smart phone (or other phone), tablet or other type of mobile device. In some embodiments, the NFC device includes an NFC reader.

Techniques are also disclosed herein that use the NFC device location information to perform one or more operations. For example, in some embodiments, after determining the location of an NFC device within a mobile device, the user interface of the mobile device may be configured to display a visual indication (e.g., an image) that depicts the tap zone for the mobile device. In some embodiments, the mobile device selects between different user interfaces that each have a visual indication depicting a different tap zone to display based on where the NFC device resides within the mobile device. In some other embodiments, after a first mobile device determines the location of an NFC device in a second mobile device, the first mobile device selects among different user interfaces to display the tap zone of the second mobile device on the display of the first mobile device. In some alternative embodiments, after a first mobile device determines the location of an NFC device in a second mobile device, the first mobile device signals that NFC device location to the second mobile device so that the second mobile device is able to display its tap zone in the correct location on its display.

When the correctly located tap zone is displayed on the display of a mobile device, the mobile device can be used to perform NFC communication with a second NFC device by tapping the second NFC device within the tap zone. For example, in some embodiments, the second NFC device is part of a payment card (e.g., credit card, debit card, loyalty card, etc.) can be read by tapping the second NFC device in the tap zone of the mobile device. In some other embodiments, this NFC device may be in a second mobile device (e.g., smart or other mobile phone, tablet, etc.). The NFC communication can be part of a commercial transaction, thereby enabling the transfer of information to complete the commercial transaction. Thus, the mobile device can determine the location of the tap zone and then use the tap zone to complete a commercial transaction using its NFC device. By displaying the correct tap zone, the user experience to the merchant using the mobile device to complete the transaction is greatly improved and increases the efficiency of completing the transaction.

FIG. 1 is a block diagram of an exemplary system architecture 100 that supports contactless payments using a mobile device that displays a tap zone on its display after determining the location of its NFC device in its interior. In embodiments, the reader device is used for processing merchant payments with a commerce platform.

Figure 7:
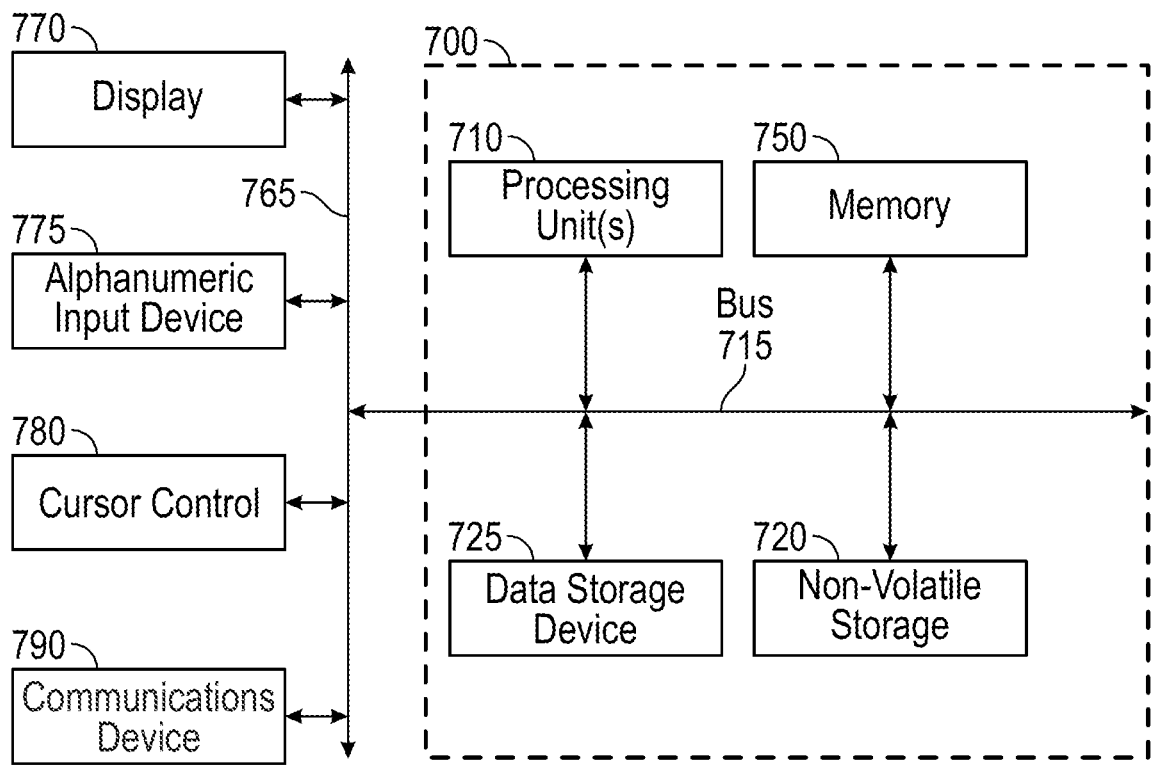
FIG. 7 is one embodiment of a computer system that may be used to support the systems and operations discussed herein.

In one embodiment, the system includes one or more point of sale (POS) devices 130, one or more merchant servers 140, one or more commerce platform servers 150, and one or more authorization network servers 160. In one embodiment, POS devices 130 may be computing devices, such as a smartphone, tablet computer, laptop computer, computerized, or other hardware device that implements a payment application of a merchant. In one embodiment, the payment application is an application that enables an employee or agent of the merchant to collect payment and complete transactions for goods or services offered by the merchant. In embodiments, the application may be a web-based application served by one or more of the merchant server(s) 140 or other computer servers at the direction of the merchant. Furthermore, merchant server(s) 140, authorization network server(s) 160, and commerce platform server(s) 150 are also computing devices, such as server computers, desktop computers, etc. that include typical computing hardware, as illustrated in FIG. 7 below.

Merchant POS devices 130 include NFC reader devices. Some embodiments of a mobile device (e.g., mobile phone) with an NFC reader device are illustrated and described in greater detail below in FIG. 8. In some embodiments, the communication link between the NFC reader device and other portions of the mobile device is secured by a secure protocol for the exchange of information, such as utilizing symmetric or asymmetric encryption-based communications.

In some embodiments, mobile device 800 performs transactions using the services of commerce platform server(s) 150. A payment processor is one example of a commerce platform. In some embodiments, the mobile device 800 can include an NFC reader 802, memory 806, a network interface 808 for establishing wireless communications links, and at least one processor 804, as well as other hardware components typically associated with mobile devices.

Figure 8:
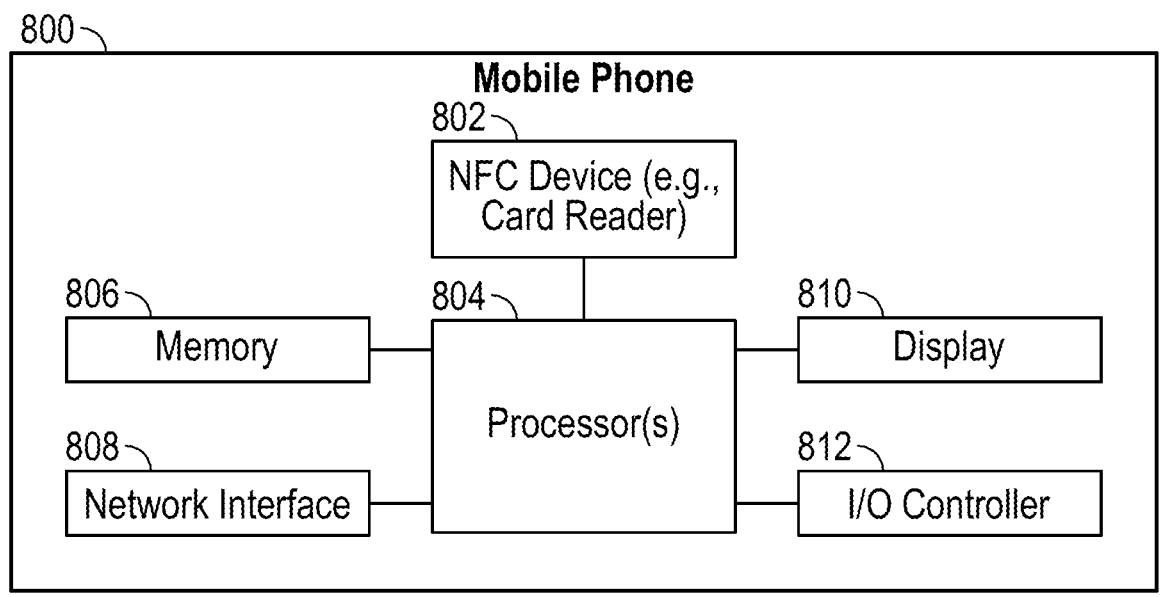
FIG. 8 is one embodiment of a mobile reader device that may be used to support the systems and operations discussed herein.

Furthermore, in some embodiments, the NFC reader device of the mobile device in FIG. 8 receives user input, etc. from or associated with a payment card 110. In some embodiments, the NFC reader device of the mobile device in FIG. 8 receives user input, etc. from or associated with mobile device (e.g., mobile phone) 115.

Once card data 110 is read by the NFC reader device, the card data is provided by the reader device to the commerce platform server(s) 150 for performing one or more payment processing operations. In some embodiments, this can include one or more of tokenizing, authorizing, and/or approving one or more financial aspects associated with the transaction. In some other embodiments, an NFC reader device uses a mobile software development kit (SDK) installed and executing on a merchant POS device to which the NFC reader device is communicatively coupled to interact with commerce platform server(s). In either embodiment, the mobile SDK or the direct communications between the NFC reader device and commerce platform server(s) handles any received card data in such a way that it is not exposed to any merchant system thereby preventing merchant software or merchant POS device(s) 130 running a POS checkout application or the merchant server(s) 140 from being subject to the scope of PCI compliance requirements. Instead, a token is generated by commerce platform server(s) 150 after authorizing a transaction with authorization network server(s) 160 (e.g., card brand systems, issuing bank systems, etc.), and the token provided from the reader device 120 to the merchant POS device 130. The merchant's POS checkout application may then use the token authorizing the transaction to complete the transaction, and further provide the token to merchant server(s) 140 for subsequent use in obtaining remuneration identified by the token by interacting with the commerce platform server(s). One embodiment for using reader devices 120 with merchant POS devices 130 is described in U.S. patent application Ser. No. 15/997,416, filed on Jun. 4, 2018, titled "Managed Integrated Payment Environment," the disclosure of which is incorporated by reference in its entirety. Furthermore, one embodiment of techniques and systems for tokenizing transactions using services of a commerce platform are described in U.S. Pat. No. 9,830,596, issued on Nov. 28, 2017, titled "Method for Conducting a Transaction Between a Merchant Site and a Customer's Electronic Device Without Exposing Payment Information to a Server-Side Application of the Merchant Site," the disclosure of which is incorporated by reference in its entirety.

The merchant POS device(s) 130, merchant server(s) 140, commerce platform server(s) 150, authorization network server(s) 160, and embodiments of the reader device(s) 120 may be coupled to a network 102 and communicate with one another using any of the standard protocols for the exchange of information. In some embodiments, one or more of the merchant POS device(s) 130, merchant server(s) 140, commerce platform server(s) 150, and authorization network server(s) 160 may run on one Local Area Network (LAN) and may be incorporated into the same physical or logical system, or different physical or logical systems. Alternatively, one or more of the merchant POS device(s) 130, merchant server(s) 140, commerce platform server(s) 150, authorization network server(s) 160, and embodiments of the reader device(s) 120 may reside on different LANs, wide area networks, cellular telephone networks, etc. that may be coupled together via the Internet but separated by firewalls, routers, and/or other network devices. In some embodiments, commerce platform server(s) 150 may reside on a single server, or be distributed among different servers, coupled to other devices via a public network (e.g., the Internet) or a private network (e.g., LAN). Various other network configurations can be used including, for example, hosted configurations, distributed configurations, centralized configurations, etc. Furthermore, in some embodiments, merchant POS device(s) 130, merchant server(s) 140, commerce platform server(s) 150, and authorization network server(s) 160 may communicate with one another via network 102 using any of the protocols for the exchange of information, such as secure protocols including TLS, SSL, SSH, etc.

Tap Zone Determination and Display

In some embodiments, where POS device 130 is a mobile device with an NFC device (e.g., NFC reader), the mobile device programmatically identifies the location of the NFC device within the mobile device and provides information indicating that location to enable use of the NFC device. In other words, the mobile device executes software which, when running, causes the mobile device to determine the location of its NFC device within its interior to enable tap operations such as, for example, contactless payments.

As discussed above, the mobile device includes an NFC device for accepting contactless payments. In some embodiments, in order to use the NFC device for accepting contactless payments, the mobile device identifies where its NFC device resides with its interior and, based on that determination, displays the location of its tap zone on its display to enable users to tap or otherwise position their NFC device in proximity to the NFC device of the mobile device as part of processing a commercial transaction. In some embodiments, the mobile device displays the location of its tap zone by selecting among previously generated (e.g., pre-installed) user interfaces with static images depicting tap zones in different locations, based on the determined location of its NFC device. Thus, the mobile device dynamically displays a user interface depicting the tap zone based on its determination of its NFC device location.

In some embodiments, the mobile device determines the NFC device location based on mobile device type. That is, the mobile device first determines its mobile device type and then, based on its type, determines the location of its NFC device. In some embodiments, the mobile device determines its type by accessing information stored in its memory that associates NFC device locations with mobile phone types. The information may be part of an on-device library or lookup table. The library or lookup table can be part of payment processing software (e.g., application(s) and/or an SDK, etc.) downloaded to the mobile device to enable the mobile device to perform payment processing for commercial transactions. In some embodiments, the library determines which NFC zone category and user interface layout of the tap zone to display based on stored X, Y coordinates of the NFC device location. An NFC tap icon (and displayed tap zone when necessary) can also be dynamically placed based on the stored X, Y coordinates.

In some other embodiments, the mobile device determines its type by using an application programming interface (API) to an operating system running on the mobile device. In some other embodiments, the mobile device determines its type by requesting the information from on-line resources using a network communication. In some alternative embodiments, the mobile device determines its type by using an API that allows users to specify their own NFC device locations.

In some embodiments, the mobile device determines what type of device it is and based on that determines its tap zone. Thereafter, the mobile device displays and/or updates its user interface to show a visual indicator of the tap zone to enable users to perform a tap with their NFC device in order to exchange information with the mobile device.

Figure 2:
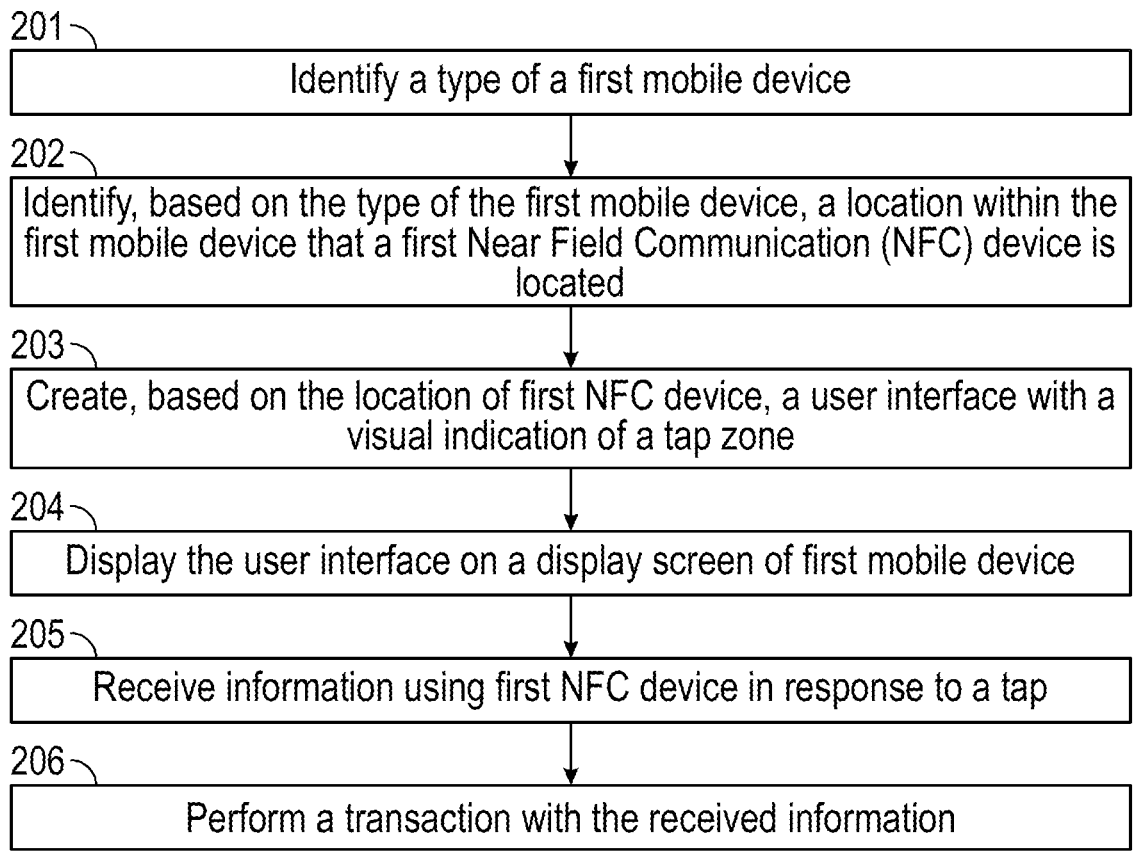
FIG. 2 illustrates some embodiments of a method for configuring an NFC-based tap zone for a mobile device.

FIG. 2 illustrates some embodiments of a method for configuring a Near Field Communication (NFC)-based tap zone for a mobile device. The method can be performed by processing logic that may include hardware (circuitry, dedicated logic, etc.), software (such as is run on a general-purpose computer system or a dedicated machine), firmware, or a combination thereof. In some embodiments, the method is performed by a mobile device containing the NFC device. In some other embodiments, one or more of the operations are performed by one or more other devices with the remainder of the operations being performed by the mobile device containing the NFC device.

Referring to FIG. 2, processing logic identifies a type of a first mobile device (processing block 201) and identifies, based on the type of the first mobile device, a location of a first NFC device within the first mobile device (processing block 202). In other words, processing logic identifies the location where the first NFC device resides within the first mobile device. In some embodiments, the first NFC device is an NFC reader. In some embodiments, identifying, based on the type of the first mobile device, the location of the first NFC device includes accessing a data structure that stores a plurality of NFC locations for a plurality of mobile device types; and obtaining, from the data structure, the location of the first NFC device based on the type of the first mobile device. In some embodiments, the first mobile device includes an operating system, and wherein identifying, based on the type of the first mobile device, the location of the first NFC device includes obtaining the location from the operating system of the mobile device. In some embodiments, the first mobile device determines the type by using an API by which a user sends a request or sets the type.

After identifying the location of the NFC device within the first mobile device, processing logic creates a user interface with a visual indication of a tap zone, based on the location of a first NFC device (processing block 203). In some embodiments, the tap zone is an area of the first mobile device that a second NFC device may be placed in proximity to enable NFC communication to occur between the first and second NFC devices. Thus, the tap zone provides an indication of where two NFC devices should be placed relative to each other to enable an NFC communication to occur. The NFC communication can be an NFC-based transfer of data or other information. In some embodiments, the NFC communication is related to a payment transaction. The data or other information can include data that is used as part of completing a payment transaction, including, but not limited to, payment card data such as card numbers and/or personal identification numbers (PINs).

In some embodiments, processing logic creates the user interface with the visual indication of the tap zone by selecting the user interface from a set of predefined user interfaces based on the location of the first NFC device within the first mobile device. In some embodiments, the mobile device stores a previously created user interface for each of a number of tap zone locations, each covering a different area of the display screen of the mobile device, and the processing device selects one of those previously-created user interfaces based on the location and/or type of the mobile device.

In some embodiments, processing logic creates the user interface with the visual indication of the tap zone by selecting a tap zone graphical user interface (GUI) element from a predetermined set of tap zone GUI elements based on the location of the NFC device within the first mobile device. In this case, each tap zone GUI element in the set of tap zone GUI elements is associated with a different area of display on the mobile device. Then processing logic arranges GUI elements, including the selected tap zone GUI element, to form the user interface.

After creating the user interface, processing logic displays the user interface with a depiction of the tap zone on a display screen (processing block 204). In some embodiments, the display screen is part of the first mobile device. That is, the mobile device that is performing the operations in processing blocks 201-203 displays the user interface. In this manner, the tap zone may be identified to users that want to perform an NFC communication with the mobile device. In some embodiments, displaying the user interface on a display screen occurs in response to a second mobile device signaling to the first mobile device when attempting to perform a transaction with the first mobile device. For example, the mobile device can be in use but not handling a transaction, and then automatically displays the tap zone when another mobile device notifies it that it wants to perform a transaction (e.g., a payment transaction). Such a notification can occur when the two mobile devices are within a certain range (e.g., short distance wireless communication range).

Figure 3B:
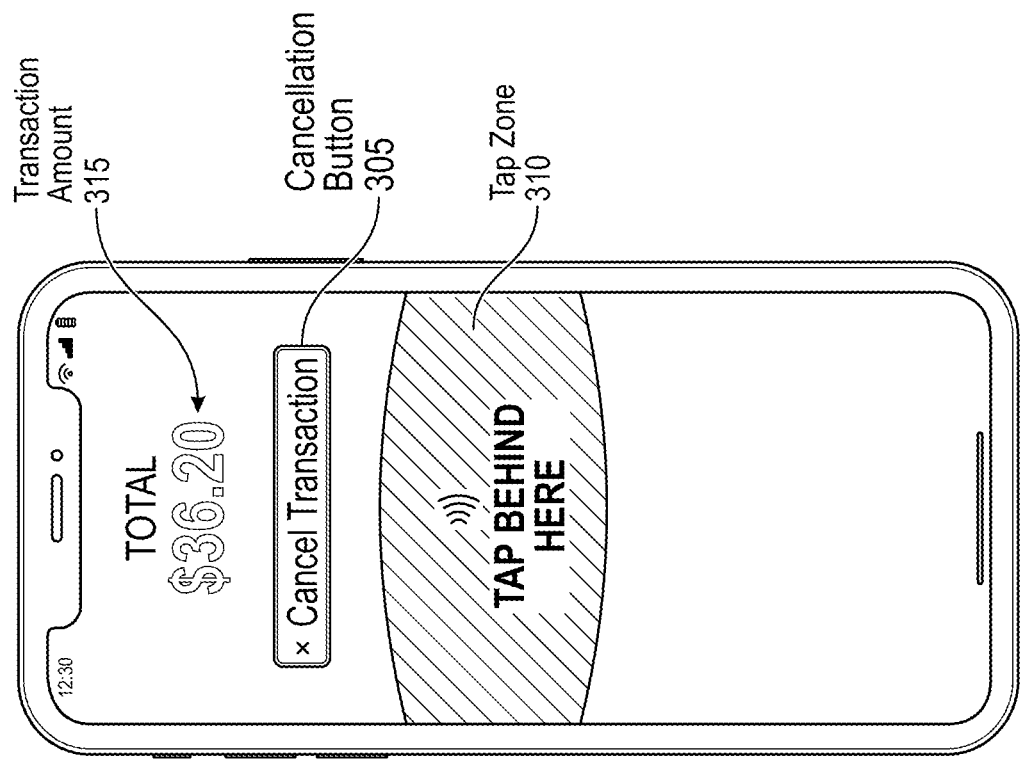
FIG. 3B illustrates an example static image of the user interface providing a visual indication of the tap zone for a mobile device.
Figure 3A:
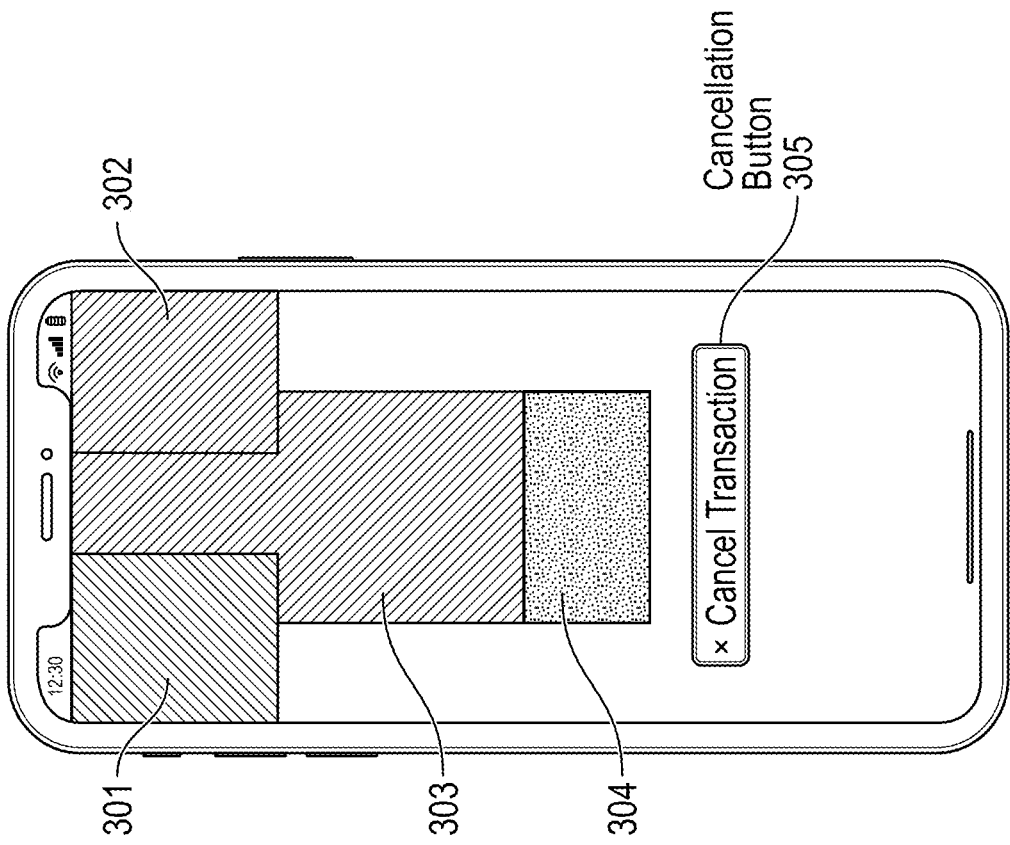
FIG. 3A illustrates four example locations of an NFC reader.

FIG. 3A illustrates four example locations of an NFC reader. Referring to FIG. 3A, four tap zone locations 301-304 are depicted. In some embodiments, a default tap zone location is the combination of all of tap zone locations 301-304, thereby providing five tap zone locations. In some embodiments, there is a static tap zone screen used with the user interface for each of tap zones 301-304 (and a default tap zone), and the tap zone screen that is selected is the one that is closest to the location of the NFC device. Note that tap zone locations other than those shown in FIG. 3A can be used and there could be more than four static tap zone screens visually depicting these tap zone locations.

In some embodiments, depending on the location of the tap zone, other transaction information may be displayed on the user interface, such as, for example, a transaction amount and card brand logos. For example, in some embodiments, when performing a commercial transaction with the NFC device (e.g., NFC reader) in one of tap zones 301-303, the transaction amount and card brand logos can be displayed in area 304, while the transaction amount and card brand logos can be displayed in area 303 when the tap zone is in area 304. In some embodiments, a cancel transaction button 305 to cancel a transaction can be included in the user interface along with the tap zone.

FIG. 3B illustrates an example static image of the user interface providing a visual indication of the tap zone for a mobile device. Referring to FIG. 3B, based on the type of mobile device, tap zone 303 was selected and the static image of the tap zone is shown with a TAP BEHIND HERE annotation 310 to indicate the tap zone location. A cancel transaction button 305 and a transaction amount 315 are also included in the user interface.

Figure 3C:
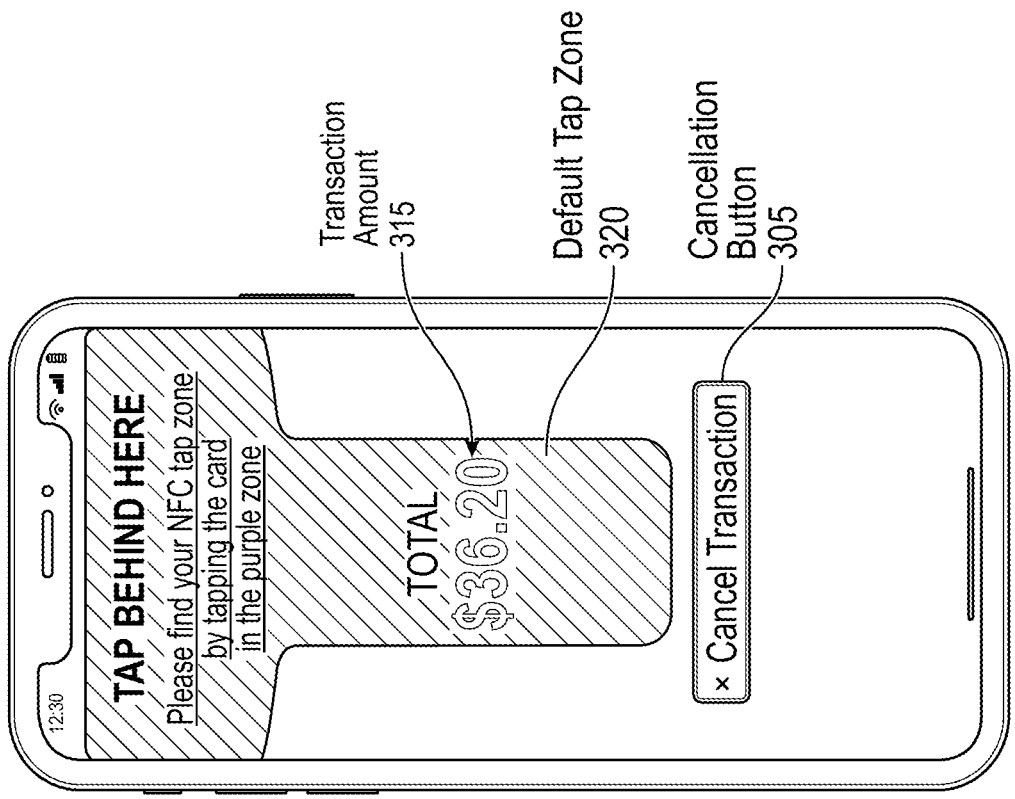
FIG. 3C illustrates an example of a static image of the user interface selected when using the default tap zone that can be used when the tap zone location is not known.

FIG. 3C illustrates an example of a static image of the user interface selected when using the default tap zone that can be used when the tap zone location is not known. Referring to FIG. 3C, the static image of the tap zone is shown with a TAP BEHIND HERE annotation 320 to indicate the tap zone location, with cancel transaction button 305 and a transaction amount 315.

Referring back to FIG. 2, in some embodiments, the process also includes processing logic receiving information using the NFC device of the first mobile device in response to the occurrence of a tap (processing block 205). Note that the tap can be a physical touching between two NFC devices or can be that the NFC devices of two mobile devices (e.g., two mobile phones, a payment card and a mobile phone, etc.) are within the requisite distance of each other. In some embodiments, the information can be payment card or identification information to be used in completing a commercial transaction.

After receiving the information using the first mobile device, processing logic performs a transaction with the received information (processing block 206). As mentioned above, in some embodiments, the transaction can be a commercial transaction.

In some alternative embodiments, while a first mobile device determines what type of device it is and based on that determines its tap zone, a second mobile device displays the visual indication of the tap zone of the first mobile device. Then the user of the second mobile device can position its NFC device with respect to the tap zone of the first mobile device to perform a tap on the first mobile device to perform an NFC communication. In such a case, in some embodiments, the operations of identifying the type of the first mobile device, identifying the location within the first mobile device where the first NFC device resides, and creating the user interface with the visual indication of the tap zone are performed by the first mobile device and then the user interface with the visual indication of the tap zone, or information identifying the same, are signaled to the second mobile device to enable the second mobile device to display the tap zone on its display screen. Thereafter, the two mobile devices can perform an NFC-based communication by having the user of the second mobile device position its NFC device in proximity to the NFC device of the first mobile device using the tap zone displayed on the user interface of the second mobile device.

Figure 4A:
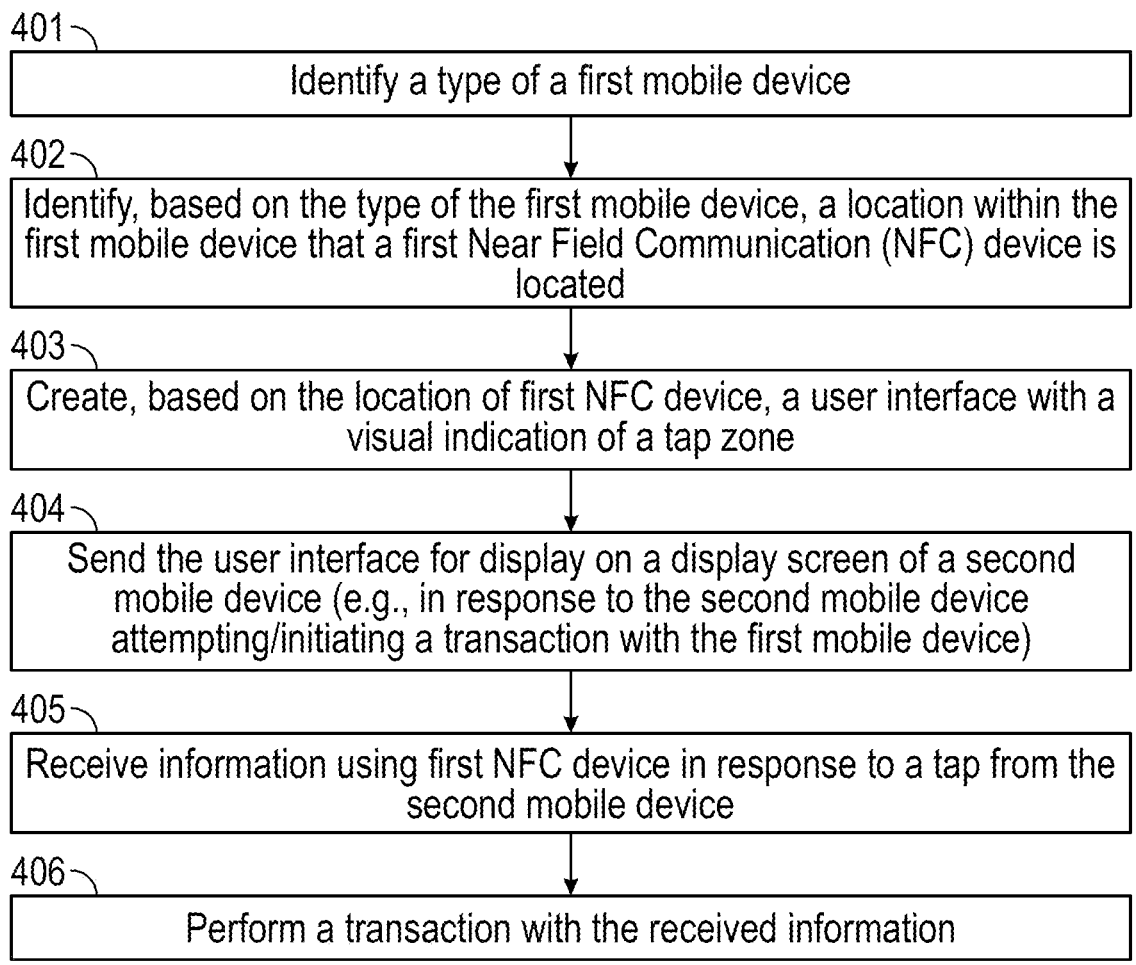
FIG. 4A illustrates some other embodiments of a method for configuring an NFC-based tap zone for a mobile device.

FIG. 4A illustrates some other embodiments of a method for configuring a Near Field Communication (NFC)-based tap zone for a mobile device. The method can be performed by processing logic that may include hardware (circuitry, dedicated logic, etc.), software (such as is run on a general-purpose computer system or a dedicated machine), firmware, or a combination thereof.

Referring to FIG. 4A, processing logic identifies a type of a first mobile device (processing block 401) and identifies, based on the type of the first mobile device, a location of a first NFC device within the first mobile device (processing block 402). In other words, processing logic identifies the location where the first NFC device resides within the first mobile device. In some embodiments, the first NFC device is an NFC reader. In some embodiments, identifying, based on the type of the first mobile device, the location of the first NFC device includes accessing a data structure that stores a plurality of NFC locations for a plurality of mobile device types; and obtaining, from the data structure, the location of the first NFC device based on the type of the first mobile device. In some embodiments, the first mobile device includes an operating system, and wherein identifying, based on the type of the first mobile device, the location of the first NFC device includes obtaining the location from the operating system of the mobile device. In some embodiments, the first mobile device determines the type by using an API by which a user sends a request or sets the type.

After identifying the location of the NFC device within the first mobile device, processing logic creates a user interface with a visual indication of a tap zone, based on the location of a first NFC device (processing block 403). In some embodiments, the tap zone is an area of the first mobile device that a second NFC device may be placed in proximity to enable NFC communication to occur between the first and second NFC devices. Thus, the tap zone provides an indication of where two NFC devices should be placed relative to each other to enable an NFC communication to occur. The NFC communication can be an NFC-based transfer of data or other information. In some embodiments, the NFC communication is related to a payment transaction. The data or other information can include data that is used as part of completing a payment transaction, including, but not limited to, payment card data such as card numbers and/or personal identification numbers (PINs).

In some embodiments, processing logic creates the user interface with the visual indication of the tap zone by selecting the user interface from a set of predefined user interfaces based on the location of the first NFC device within the first mobile device. In some embodiments, the mobile device stores a previously created user interface for each of a number of tap zone locations, each covering a different area of the display screen of the mobile device, and the processing device selects one of those previously-created user interfaces based on the location and/or type of mobile device.

In some embodiments, processing logic creates the user interface with the visual indication of the tap zone by selecting a tap zone graphical user interface (GUI) element from a predetermined set of tap zone GUI elements based on the location of the NFC device within the first mobile device. In this case, each tap zone GUI element in the set of tap zone GUI elements is associated with a different area of display on the mobile device. Then processing logic arranges GUI elements, including the selected tap zone GUI element, to form the user interface.

After creating the user interface, processing logic sends the user interface with a depiction of the tap zone to be displayed on a display screen of a second mobile device (processing block 404). In this manner, the tap zone may be identified to the user of the second mobile device when the user of the second mobile device wants to perform an NFC communication with the first mobile device. In some embodiments, sending and displaying the user interface on a display screen of the second mobile device occurs in response to the second mobile device signaling to the first mobile device when attempting to perform a transaction with the first mobile device. For example, the mobile device can be in use, but not handling a transaction, and then automatically displays the tap zone when another mobile device notifies it that it wants to perform a transaction (e.g., a payment transaction). Such a notification can occur when the two mobile devices are within a certain range (e.g., short distance wireless communication range).

In some embodiments, the process also includes processing logic receiving information using the NFC device of the first mobile device in response to the occurrence of a tap (processing block 405). Note that the tap can be a physical touching between two NFC devices or can be that the NFC devices of two mobile devices (e.g., two mobile phones, a payment card and a mobile phone, etc.) are within the requisite distance of each other. In some embodiments, the information can be payment card or identification information to be used in completing a commercial transaction.

After receiving the information using the first mobile device, processing logic performs a transaction with the received information (processing block 406). As mentioned above, in some embodiments, the transaction can be a commercial transaction. In some other embodiments, transactions other than commercial transactions are performed using the information received using the first NFC device.

Figure 4B:
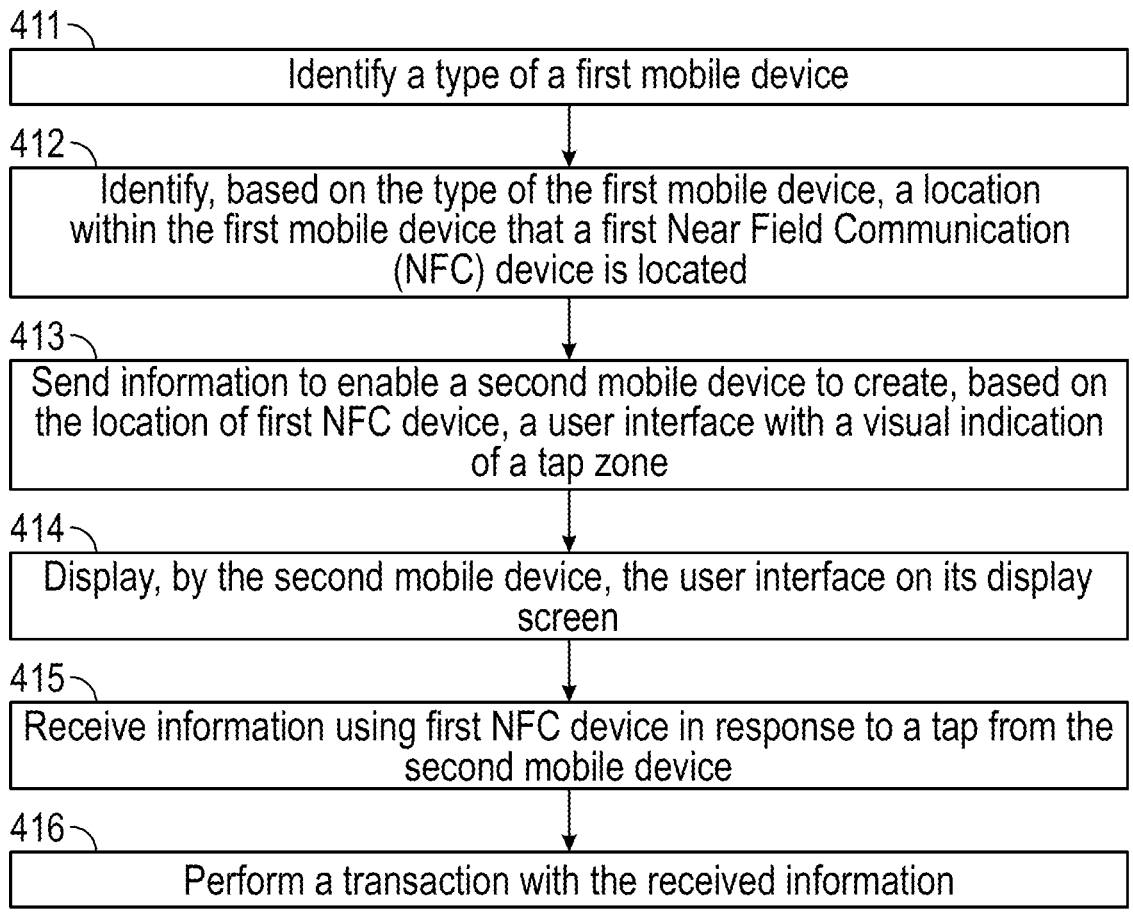
FIG. 4B illustrates some alternative embodiments of a method for configuring an NFC-based tap zone for a mobile device.

In some embodiments, instead of the first mobile device generating a user interface (e.g., display screen) and sending it to the second mobile device, the first mobile device sends the second mobile device information to enable the second mobile device to create the user interface. FIG. 4B illustrates some alternative embodiments of a method for configuring a Near Field Communication (NFC)-based tap zone for a mobile device. The method can be performed by processing logic that may include hardware (circuitry, dedicated logic, etc.), software (such as is run on a general-purpose computer system or a dedicated machine), firmware, or a combination thereof.

Referring to FIG. 4B, processing logic identifies a type of a first mobile device (processing block 411) and identifies, based on the type of the first mobile device, a location of a first NFC device within the first mobile device (processing block 412). In other words, processing logic identifies the location where the first NFC device resides within the first mobile device. In some embodiments, the first NFC device is an NFC reader. In some embodiments, identifying, based on the type of the first mobile device, the location of the first NFC device includes accessing a data structure that stores a plurality of NFC locations for a plurality of mobile device types; and obtaining, from the data structure, the location of the first NFC device based on the type of the first mobile device. In some embodiments, the first mobile device includes an operating system, and wherein identifying, based on the type of the first mobile device, the location of the first NFC device includes obtaining the location from the operating system of the mobile device. In some embodiments, the first mobile device determines the type by using an API by which a user sends a request or sets the type.

After identifying the location of the NFC device within the first mobile device, processing logic sends information to enable a second mobile device to create a user interface with a visual indication of a tap zone, based on the location of a first NFC device (processing block 413). In some embodiments, the tap zone is an area of the first mobile device that a second NFC device may be placed in proximity to enable NFC communication to occur between the first and second NFC devices. Thus, the tap zone provides an indication of where two NFC devices should be placed relative to each other to enable an NFC communication to occur. The NFC communication can be an NFC-based transfer of data or other information. In some embodiments, the NFC communication is related to a payment transaction. The data or other information can include data that is used as part of completing a payment transaction, including, but not limited to, payment card data such as card numbers and/or personal identification numbers (PINs).

In some embodiments, processing logic creates the user interface with the visual indication of the tap zone by selecting the user interface from a set of predefined user interfaces based on the location of the first NFC device within the first mobile device. In some embodiments, the mobile device stores a previously created user interface for each of a number of tap zone locations, each covering a different area of the display screen of the mobile device, and the processing device selects one of those previously-created user interfaces based on the locations and/or type of mobile devices.

In some embodiments, processing logic creates the user interface with the visual indication of the tap zone by selecting a tap zone graphical user interface (GUI) element from a predetermined set of tap zone GUI elements based on the location of the NFC device within the first mobile device. In this case, each tap zone GUI element in the set of tap zone GUI elements is associated with a different area of display on the mobile device. Then processing logic arranges GUI elements, including the selected tap zone GUI element, to form the user interface.

After the second mobile device receives the information for creating the user interface, processing logic of the second mobile device displays the user interface with a depiction of the tap zone to be displayed on a display screen of a second mobile device (processing block 414). In this manner, the tap zone of the first mobile device may be identified to the user of the second mobile device when the user of the second mobile device wants to perform an NFC communication with the first mobile device. In some embodiments, displaying the user interface on a display screen of the second mobile device occurs in response to the second mobile device signaling to the first mobile device when attempting to perform a transaction with the first mobile device. For example, the mobile device can be in use, but not handling a transaction, and then automatically displays the tap zone when another mobile device notifies it that it wants to perform a transaction (e.g., a payment transaction). Such a notification can occur when the two mobile devices are within a certain range (e.g., short distance wireless communication range).

In some embodiments, the process also includes processing logic receiving information using the NFC device of the first mobile device in response to the occurrence of a tap (processing block 415). Note that the tap can be a physical touching between two devices or can be that the NFC devices of two mobile devices (e.g., two mobile phones, a payment card and a mobile phone, etc.) that are within the requisite distance of each other. In some embodiments, the information can be payment card or identification information to be used in completing a commercial transaction.

After receiving the information using the first mobile device, processing logic performs a transaction with the received information (processing block 416). As mentioned above, in some embodiments, the transaction can be a commercial transaction.

In some other alternative embodiments, a first mobile phone determines the device type of a second mobile device (or communicates with it to identify what type of mobile device it is) and determines where the NFC device is on that second mobile device. Thereafter, the first mobile device displays the visual indication of the tap zone of the second mobile device on its display and then can be positioned with respect to the NFC device of the second mobile device for a tap transaction by the first mobile device.

Figure 5:
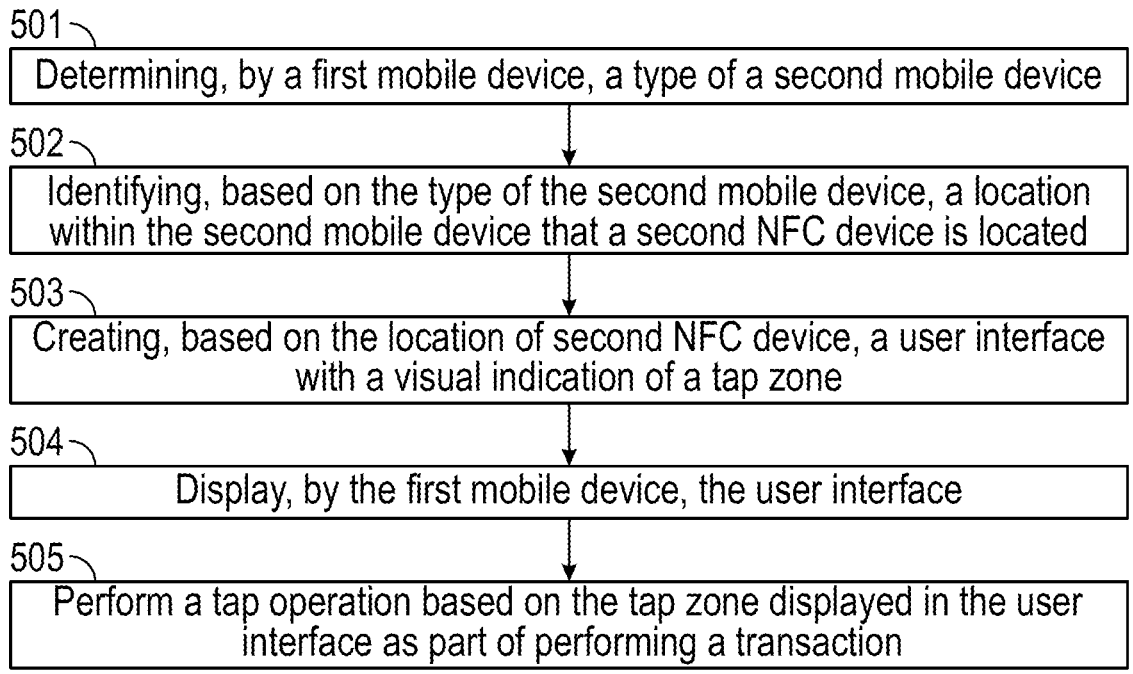
FIG. 5 illustrates some other alternative embodiments of a method configuring an NFC-based tap zone for a mobile device.

FIG. 5 illustrates some other alternative embodiments of a method configuring a Near Field Communication (NFC)-based tap zone for a mobile device. The method can be performed by processing logic that may include hardware (circuitry, dedicated logic, etc.), software (such as is run on a general-purpose computer system or a dedicated machine), firmware, or a combination thereof.

Referring to FIG. 5, processing logic of the first mobile device identifies a type of a second mobile device (processing block 501) and then identifies, based on the type of the second mobile device, a location of a second NFC device within the second mobile device (processing block 502). In other words, processing logic of the second mobile device identifies the location where the second NFC device resides within the second mobile device. In some embodiments, identifying, based on the type of the second mobile device, the location of the second NFC device includes accessing a data structure that stores a plurality of NFC locations for a plurality of mobile device types; and obtaining, from the data structure, the location of the first NFC device based on the type of the first mobile device. In some embodiments, the first mobile device includes an operating system, and wherein identifying, based on the type of the first mobile device, the location of the first NFC device includes obtaining the location from the operating system of the mobile device. In some embodiments, the first mobile device determines the type by using an API by which a user sends a request or sets the type.

In some embodiments, determining the type of the second mobile device includes receiving information indicative of the type of the second mobile device from the second mobile device; and accessing the type of the second mobile device using the information indicative of the type received from the second mobile device. In some embodiments, receiving information indicative of the type of the second mobile device from the second mobile device occurs in response to the first mobile device attempting to make a transaction with the second mobile device. In some embodiments, accessing the type of the second mobile device using the information indicative of the type received from the second mobile device includes sending a request, via a network communication, for the type, the request including the information indicative of the type received from the second mobile device.

After identifying the location of the second NFC device within the second mobile device, processing logic creates a user interface with a visual indication of a tap zone of the second mobile device, based on the location of a second NFC device (processing block 503). In some embodiments, the tap zone is an area of the second mobile device that a first NFC device of the first mobile device may be placed in proximity to enable NFC communication to occur between the first and second NFC devices. Thus, the tap zone provides an indication of where two NFC devices should be placed relative to each other to enable an NFC communication to occur. The NFC communication can be an NFC-based transfer of data or other information. In some embodiments, the NFC communication is related to a payment transaction. The data or other information can include data that is used as part of completing a payment transaction, including, but not limited to, payment card data such as card numbers and/or personal identification numbers (PINs).

In some embodiments, processing logic creates the user interface with the visual indication of the tap zone by selecting the user interface from a set of predefined user interfaces based on the location of the second NFC device within the first mobile device. In some embodiments, the first mobile device stores a previously created user interface for each of a number of tap zone locations for other mobile devices, each covering a different area of the display screen of the mobile device, and the processing device selects one of those previously-created user interfaces based on the location and/or type of mobile device.

In some embodiments, processing logic creates the user interface with the visual indication of the tap zone by selecting a tap zone graphical user interface (GUI) element from a predetermined set of tap zone GUI elements based on the location of the second NFC device within the second mobile device. In this case, each tap zone GUI element in the set of tap zone GUI elements is associated with a different area of display on the first mobile device. Then processing logic arranges GUI elements, including the selected tap zone GUI element, to form the user interface.

After creating the user interface, processing logic displays the user interface with a depiction of the tap zone on a display screen of the first mobile device (processing block 504). In this manner, the tap zone may be identified to users of the first mobile device that want to perform an NFC communication with the mobile device. In some embodiments, displaying the user interface on a display screen occurs in response to the second mobile device signaling to the first mobile device when attempting to perform a transaction with the first mobile device. For example, the first mobile device can be in use, but not handling a transaction, and then automatically displays the tap zone when the second mobile device notifies it that it wants to perform a transaction (e.g., a payment transaction). Such a notification can occur when the two mobile devices are within a certain range (e.g., short distance wireless communication range).

After displaying the user interface, processing logic performs a tap operation based on the tap zone displayed in the user interface as part of performing a transaction (processing block 505). As mentioned above, in some embodiments, the transaction can be a commercial transaction. In some other embodiments, transactions other than commercial transactions are performed using the information received using the first NFC device.

The example processes described above for programmatically determining the NFC location within a mobile device and displaying a visual indication of a tap zone to make use of NFC communication with the mobile device may be triggered in a number of ways. In some embodiments, the process can be triggered by downloading software to the mobile device. For example, in some embodiments, when downloading software to perform payment transactions, the mobile device can determine the location of the NFC device within its interior and display a visual indication of a tap zone. In some other embodiments, the mobile device determines the location of its NFC device and its tap zone location but does not display the visual depiction of the tap zone on its display until the mobile device is ready to read the payment card for a transaction.

In some embodiments, the processes described above, including those in FIGS. 2, 4A, 4B and 5, are triggered in response to a transaction being performed by one of the mobile devices, such as, for example, where the transaction reaches the point where receiving payment card information is to occur. At that point, the mobile device determines the location of its NFC device within its interior and displays a visual indication of a tap zone for the NFC device. Alternatively, the mobile device can determine the location of its NFC device within its interior prior to that point, but only displays the visual indication of a tap zone for the NFC device to complete a payments transaction when the transaction has reached the point when it needs the payment card information.

In some other embodiments, the processes described above are triggered in response to one of the mobile devices determining another mobile device is in proximity to it. For example, if the mobile device determines through short-range wireless communication (e.g., Bluetooth, Zigbee, etc.) or other wireless communication that another mobile device is nearby, then the mobile device can determine the location of the NFC device within its interior and display a visual indication of a tap zone. In some other embodiments, the mobile device determines the location of its NFC device and its tap zone location but does not display the visual depiction of the tap zone on its display until after the mobile device receives the other wireless communication.

In yet some other embodiments, the processes described herein are triggered in response to a communication (e.g., email, SMS message, etc.) occurring between the two mobile devices indicating that the two mobile devices are near or within a predetermined distance of each other.

In some embodiments, the processes described herein are triggered in response to pressing or selecting a button or other graphical user interface (GUI) element being displayed on the display of the mobile device.

ADDITIONAL ALTERNATIVE EMBODIMENTS

In some embodiments, the NFC device location is determined using a calibration phase performed with the mobile device. In the calibration phase, a user of the mobile device or a customer proceeds by placing another NFC device (e.g., payment card, mobile phone, etc.) in proximity to the mobile device at a number of different locations. In other words, the user taps their mobile device with the other NFC device at various locations until one is found where an information exchange occurs. At this point, that location is then considered the NFC device location and it is recorded by the mobile device for later use in creating the user interface with a visual indication of its tap zone. This process can be done as part of a dummy transaction being performed by the mobile device.

Figure 6:
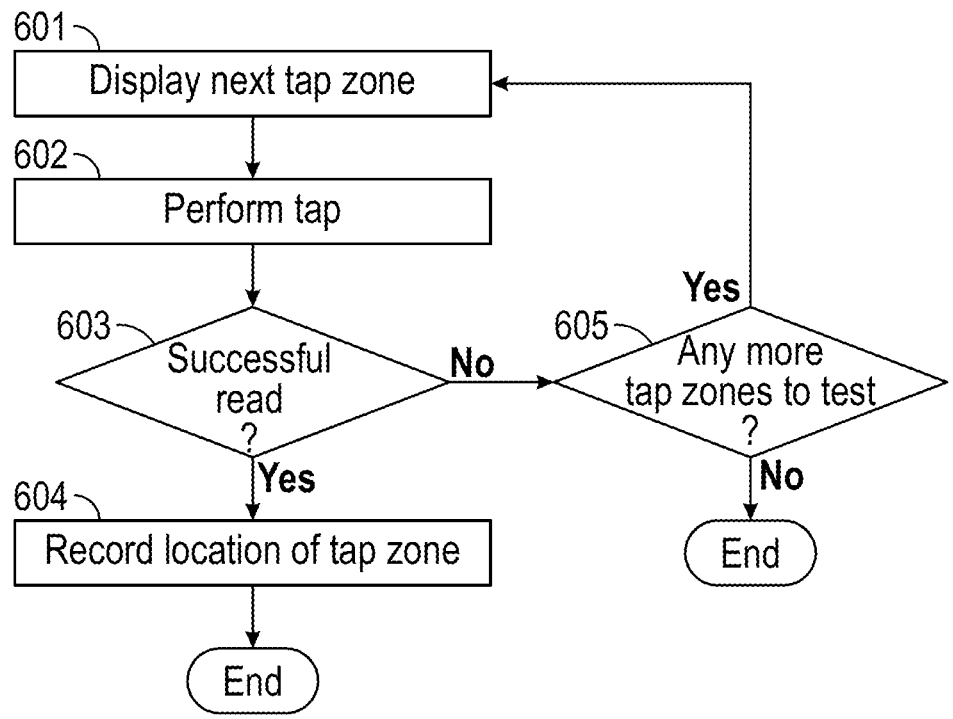
FIG. 6 illustrates some embodiments of a calibration method for identifying a location of an NFC device (e.g., NFC reader).

FIG. 6 illustrates some embodiments of a calibration method for identifying a location of an NFC device (e.g., NFC reader). The method can be performed by processing logic that may include hardware (circuitry, dedicated logic, etc.), software (such as is run on a general-purpose computer system or a dedicated machine), firmware, or a combination thereof. In some embodiments, the method is performed by a mobile device.

Referring to FIG. 6, processing logic displays a visual indication of a tag zone on the mobile device (processing logic 601). After displaying the tap zone, a user taps another NFC device (e.g., payment card, mobile device) at that location for the requisite amount of time for an NFC transaction (processing block 602). Processing logic determines whether any information has been read by the NFC device as a result of the tap (processing block 603). If information was read, processing logic records that tap zone location as the location of the NFC device (processing block 604) and the process ends. If information is not read, processing transitions to processing block 605 where processing logic tests whether there are any additional tap zone locations to test. If so, the process transitions to processing block 601 and the process repeats. If not, the process ends without determining an NFC device location. At this point, processing logic can display a default tap zone (e.g., FIG. 3C).

In some other additional alternative embodiments, after determining the location of an NFC device within a mobile device, the NFC device and its visually depicted tap zone may be used for purposes other than tap-to-pay contactless payments. For example, the NFC device can be used for downloading information, such as by tapping or waving the mobile device over the NFC device to read information from the NFC device. This would enable transfers of information such as, for example, contact information, photographs, web pages, or other type of information The NFC device can be used for boarding (e.g., transit) and security passes to gain access to locations and/or devices (e.g., buildings, trains, buses, cars, etc.) as well.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 715 for communicating information, and one or more processor(s) 710 coupled to the bus 715 for processing information. The system further includes a random-access memory (RAM) or other volatile storage device 750 (referred to as memory), coupled to bus 715 for storing information and instructions to be executed by processor(s) 710. Main memory 750 also may be used for storing temporary variables or other intermediate information during execution of instructions by processor(s) 710. The system also includes a read only memory (ROM) and/or static storage device 720 coupled to bus 715 for storing static information and instructions for processor(s) 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor(s) 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

FIG. 8 is a block diagram of one embodiment of a mobile device with an NFC reader. In one embodiment, the mobile device 800 can include a combination of one or more processors 804, a memory 806, I/O controller 812, network interface 808, and display (e.g., display 810), in accordance with the illustration of FIG. 8. Each mobile device may also include a number of processing modules, which may be implemented as hardware, software, firmware, or a combination. It should be appreciated that the mobile device may also include, although not illustrated, a user interface (e.g., keyboard, touch-screen, buttons, or similar user input devices), a power device (e.g., a battery), as well as other components typically associated with electronic devices. Network interfaces of each reader device may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

Memory 806 may be coupled to processor(s) in each reader device to store instructions for execution by processor(s) 804. In some embodiments, the memory is non-transitory. It should be appreciated that embodiments as described herein may be implemented through the execution of instructions, for example as stored in the memory (e.g., memory 806) or other element, by processor(s) 804 of the mobile device and/or another circuitry of the mobile device. Particularly, circuitry of the reader devices, including but not limited to processor and card reader, may operate under the control of a program, routine, or the execution of instructions to execute methods or processes in accordance with the embodiments described herein. For example, such a program may be implemented in firmware or software (e.g. stored in memory and/or other locations) and may be implemented by processors, such as processor and card reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

There are a number of example embodiments described herein.

Example 1 is a method comprising: identifying a type of a first mobile device; identifying, based on the type of the first mobile device, a location within the first mobile device where a first Near Field Communication (NFC) device is located; creating, based on the location of first NFC device, a user interface with a visual indication of a tap zone, the tap zone being an area of the first mobile device that a second NFC device may be placed in proximity to enable NFC communication to occur between the first and second NFC devices; and displaying the user interface on a display screen.

Example 2 is the method of example 1 that may optionally include that creating the user interface with the visual indication of the tap zone comprises selecting the user interface from a set of predefined user interfaces based on the location of the first NFC device within the first mobile device.

Example 3 is the method of example 1 that may optionally include that creating the user interface with the visual indication of the tap zone comprises: selecting a tap zone graphical user interface (GUI) element from a predetermined set of tap zone GUI elements based on the location of the NFC device within the first mobile device, each tap zone GUI element in the set of tap zone GUI elements being associated with a different area of display on the mobile device; and arranging a plurality of GUI elements including the selected tap zone GUI element to form the user interface.

Example 4 is the method of example 1 that may optionally include that identifying, based on the type of the first mobile device, the location of the first NFC device comprises: accessing a data structure that stores a plurality of NFC locations for a plurality of mobile device types; and obtaining, from the data structure, the location of the first NFC device based on the type of the first mobile device.

Example 5 is the method of example 1 that may optionally include that the first mobile device includes an operating system, and wherein identifying, based on the type of the first mobile device, the location of the first NFC device comprises obtaining the location from the operating system of the mobile device.

Example 6 is the method of example 1 that may optionally include that the first NFC device is an NFC reader.

Example 7 is the method of example 1 that may optionally include that the NFC communication is related to a payment transaction.

Example 8 is the method of example 1 that may optionally include that the display screen is part of the first mobile device.

Example 9 is the method of example 1 that may optionally include that the display screen is part of the second mobile device, different from the first mobile device, and wherein identifying the type of the first mobile device, identifying the location within the first mobile device that the first NFC device is located, and creating the user interface with the visual indication of the tap zone are performed by the second mobile device.

Example 10 is the method of example 1 that may optionally include that displaying the user interface on a display screen occurs in response to the second mobile device signaling to the first mobile device when attempting to perform a transaction with the first mobile device.

Example 11 is a mobile device for performing a transaction with a payment card, the mobile device comprising: a first Near Field Communication (NFC) device; a display screen; a memory; a processor coupled to the first NFC device, the display screen, and the memory, wherein the processor is configured to: identify a type of the mobile device; identify, based on the type of the mobile device, a location within the first mobile device where a first NFC device is located; create, based on the location of first NFC device, a user interface with a visual indication of a tap zone, the tap zone being an area of the first mobile device that a second NFC device may be placed in proximity to enable NFC communication to occur between the first and second NFC devices, and display the user interface on the display screen.

Example 12 is the mobile device of example 11 that may optionally include that the processor is configured to create the user interface with the visual indication of the tap zone by selecting the user interface from a set of predefined user interfaces based on the location of the NFC device within the first mobile device.

Example 13 is the mobile device of example 11 that may optionally include that the processor is configured to create the user interface with the visual indication of the tap zone by: selecting a tap zone graphical user interface (GUI) element from a predetermined set of tap zone GUI elements based on the location of the NFC device within the first mobile device, each tap zone GUI element in the set of tap zone GUI elements being associated with a different area of display on the mobile device; and arranging a plurality of GUI elements including the selected tap zone GUI element to form the user interface.

Example 14 is the mobile device of example 11 that may optionally include that the processor is configured to identify, based on the type of the first mobile device, the location of the first NFC device by: accessing a data structure that stores a plurality of NFC locations for a plurality of mobile device types; and obtaining, from the data structure, the location of the first NFC device based on the type of the first mobile device.

Example 15 is the mobile device of example 11 that may optionally include an operating system, and wherein the processor is configured to identify, based on the type of the first mobile device, the location of the first NFC device by obtaining the location from the operating system of the mobile device.

Example 16 is the mobile device of example 11 that may optionally include that the first NFC device is an NFC reader.

Example 17 is a method comprising: determining, by a first mobile device, a type of a second mobile device, the first mobile device having a first Near Field Communication (NFC) device; identifying, based on the type of the second mobile device, a location within the second mobile device where a second NFC device is located; creating, based on the location of second NFC device, a user interface with a visual indication of a tap zone, the tap zone being an area of the second mobile device that the first NFC device may be placed in proximity to enable NFC communication to occur between the first and second NFC devices; and displaying, by the first mobile device, the user interface.

Example 18 is the method of example 17 that may optionally include that determining the type of the second mobile device comprises: receiving information indicative of the type of the second mobile device from the second mobile device; and accessing the type of the second mobile device using the information indicative of the type received from the second mobile device.

Example 19 is the method of example 18 that may optionally include that receiving information indicative of the type of the second mobile device from the second mobile device occurs in response to the first mobile device attempting to make a transaction with the second mobile device.

Example 20 is the method of example 18 that may optionally include that accessing the type of the second mobile device using the information indicative of the type received from the second mobile device comprises sending a request, via a network communication, for the type, the request including the information indicative of the type received from the second mobile device.

Methods and tasks described herein may be performed and fully automated by a computer system. The computer system may, in some cases, include multiple distinct computers or computing devices (e.g., physical servers, workstations, storage arrays, cloud computing resources, etc.)

that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A method comprising:
   performing, by the first mobile device, a calibration process that discovers a location within the first mobile device where a first Near Field Communication (NFC) device is located based on exchanging information between the first NFC device and a third NFC device during the calibration process, and performing the calibration process further comprises:

displaying, by the first mobile device, a visual indication of a potential tap zone corresponding to a potential location where the first NFC device may be located, determining, by the first mobile device, whether information has been read by the first NFC device from the third NFC device as a result of a tap of the third NFC device at the potential tap zone, and when information is determined not to have been read by the first NFC device, determining that another potential tap zone exists in a different location where the first NFC device may be located in the first mobile device, displaying, by the first mobile device, another visual indication corresponding to the different location where the another potential tap zone is located, and repeating the determining that another potential tap zone exists and the displaying the another visual indication until information is determined to have been read by the first NFC device from the third NFC device, and when information is read by the first NFC device at either the potential location or the different location, storing the potential location or the different location where the information has been read as a location within the first mobile device where the first NFC device is located;

creating, by the first device based on the location of the first NFC device, a user interface depicting an image of a tap zone, the user interface different from a user interface rendered on the first device, and the tap zone being an area of the first mobile device that a second NFC device of a second mobile device may be placed in proximity to enable NFC communication to occur between the first and second NFC devices; and sending the user interface to the second mobile device that contains the second NFC device causing the second mobile device to display the user interface with the image on a display screen of the second mobile device.

2. The method of claim 1 wherein creating the user interface depicting an image of the tap zone comprises selecting the user interface from a set of predefined user interfaces based on the location of the first NFC device within the first mobile device.

3. The method of claim 1 wherein creating the user interface depicting an image of the tap zone comprises:

selecting a tap zone graphical user interface (GUI) element from a predetermined set of tap zone GUI elements based on the location of the NFC device within the first mobile device, each tap zone GUI element in the set of tap zone GUI elements being associated with a different area of display on the mobile device; and arranging a plurality of GUI elements including the selected tap zone GUI element to form the user interface.

4. The method of claim 1 wherein the first NFC device is an NFC reader.

5. The method of claim 1 wherein the NFC communication is related to a payment transaction.

6. The method of claim 1 wherein causing the display of the user interface on the display screen of the second mobile device occurs in response to the second mobile device signaling to the first mobile device when attempting to perform a transaction with the first mobile device using NFC communication.

7. The method of claim 1 further comprising:

performing a data transfer between the first mobile device and the second mobile device, and wherein causing display of the user interface with the image on the display screen comprises causing display of the user interface with the image on the display screen as part of the data transfer in which the first mobile device is to; receive data related to the data transfer that is transferred from the second NFC device to the first NFC device using the NFC communication and/or send data related to the data transfer that is transferred from the first NFC device to the second NFC device using the NFC communication.

8. A mobile device for performing a transaction with a payment card, the mobile device comprising:

a first Near Field Communication (NFC) device;

a memory;

a processor coupled to the first NFC device and the memory, wherein the processor is configured to:

perform a calibration process that discovers a location within the first mobile device where the first NFC device is located based on exchanging information between the first NFC device and a third NFC device during the calibration process, and the processor performing the calibration process further comprises the processor to:

display a visual indication of a potential tap zone corresponding to a potential location where the first NFC device may be located, determine whether information has been read by the first NFC device from the third NFC device as a result of a tap of the third NFC device at the potential tap zone, and when information is determined not to have been read by the first NFC device, determine that another potential tap zone exists in a different location where the first NFC device may be located in the first mobile device, display another visual indication corresponding to the different location where the another potential tap zone is located, and repeat the determining that another potential tap zone exists and the displaying the another visual indication until information is determined to have been read by the first NFC device from the third NFC device, and when information is read by the first NFC device at either the potential location or the different location, store the potential location or the different location where the information has been read as a location within the first mobile device where the first NFC device is located, create, based on the location of the first NFC device, a user interface depicting an image of a tap zone, the user interface different from a user interface rendered on the first device, and the tap zone being an area of the first mobile device that a second NFC device of a second mobile device may be placed in proximity to enable NFC communication to occur between the first and second NFC devices, and send the user interface to the second mobile device that contains the second NFC device to cause the second mobile device to display the user interface with the image on a display screen of the second mobile device.

9. The mobile device of claim 8 wherein the processor is configured to create the user interface depicting an image of the tap zone by selecting the user interface from a set of predefined user interfaces based on the location of the NFC device within the first mobile device.

10. The mobile device of claim 8 wherein the processor is configured to create the user interface depicting an image of the tap zone by:
  selecting a tap zone graphical user interface (GUI) element from a predetermined set of tap zone GUI elements based on the location of the NFC device within the first mobile device, each tap zone GUI element in the set of tap zone GUI elements being associated with a different area of display on the second mobile device; and
  arranging a plurality of GUI elements including the selected tap zone GUI element to form the user interface.

11. The mobile device of claim 8, wherein the first NFC device is an NFC reader.

12. The mobile device of claim 8, wherein the NFC communication is related to a payment transaction.

13. The mobile device of claim 8, wherein causing the display of the user interface on the display screen of the second mobile device occurs in response to the second mobile device signaling to the first mobile device when attempting to perform a transaction with the first mobile device using NFC communication.

14. The mobile device of claim 8, wherein the processor is further configured to:
  perform a data transfer between the first mobile device and the second mobile device, and
  wherein the processor configured to cause the display of the user interface with the image on the display screen comprises the processor configured to cause the display of the user interface with the image on the display screen as part of the data transfer in which the first mobile device is to: receive data related to the data transfer that is transferred from the second NFC device to the first NFC device using the NFC communication and/or send data related to the data transfer that is transferred from the first NFC device to the second NFC device using the NFC communication.

15. A non-transitory computer readable storage medium, having instructions stored thereon, which when executed by a processing system of a first mobile device, cause the first mobile device to perform operations, comprising:
  performing a calibration process that discovers a location within the first mobile device where a first Near Field Communication (NFC) device is located based on exchanging information between the first NFC device and a third NFC device during the calibration process, and performing the calibration process further comprises:
    displaying a visual indication of a potential tap zone corresponding to a potential location where the first NFC device may be located,
    determining whether information has been read by the first NFC device from the third NFC device as a result of a tap of the third NFC device at the potential tap zone, and
    when information is determined not to have been read by the first NFC device,
      determining that another potential tap zone exists in a different location where the first NFC device may be located in the first mobile device,
      displaying another visual indication corresponding to the different location where the another potential tap zone is located, and
      repeating the determining that another potential tap zone exists and the displaying the another visual indication until information is determined to have been read by the first NFC device from the third NFC device, and
    when information is read by the first NFC device at either the potential location or the different location, storing the potential location or the different location where the information has been read as a location within the first mobile device where the first NFC device is located;
  creating, based on the location of the first NFC device, a user interface depicting an image of a tap zone, the user interface different from a user interface rendered on the first device, and the tap zone being an area of the first mobile device that a second NFC device of a second mobile device may be placed in proximity to enable NFC communication to occur between the first and second NFC devices; and
  sending the user interface to the second mobile device that contains the second NFC device causing the second mobile device to display the user interface with the image on a display screen of the second mobile device.

16. The non-transitory computer readable storage medium of claim 15, wherein creating the user interface depicting an image of the tap zone comprises selecting the user interface from a set of predefined user interfaces based on the location of the first NFC device within the first mobile device.

17. The non-transitory computer readable storage medium of claim 15, wherein creating the user interface depicting an image of the tap zone comprises:
  selecting a tap zone graphical user interface (GUI) element from a predetermined set of tap zone GUI elements based on the location of the NFC device within the first mobile device, each tap zone GUI element in the set of tap zone GUI elements being associated with a different area of display on the mobile device; and
  arranging a plurality of GUI elements including the selected tap zone GUI element to form the user interface.

18. The non-transitory computer readable storage medium of claim 15, wherein the first NFC device is an NFC reader.

19. The non-transitory computer readable storage medium of claim 15, wherein causing the display of the user interface on the display screen of the second mobile device occurs in response to the second mobile device signaling to the first mobile device when attempting to perform a transaction with the first mobile device using NFC communication.

20. The non-transitory computer readable storage medium of claim 15, further comprising:
  performing a data transfer between the first mobile device and the second mobile device, and
  wherein causing display of the user interface with the image on the display screen comprises causing display of the user interface with the image on the display screen as part of the data transfer in which the first mobile device is to: receive data related to the data transfer that is transferred from the second NFC device to the first NFC device using the NFC communication and/or send data related to the data transfer that is transferred from the first NFC device to the second NFC device using the NFC communication.

\* \* \* \* \*